(12) United States Patent
Chang (10) Patent No.: US 6,209,413 B1
(45) Date of Patent: Apr. 3, 2001

(54) SHIFTER FOR OPERATING DERAILLEUR CABLE OF A BICYCLE DERAILLEUR MECHANISM

(76) Inventor: Wen-Pin Chang, No. 3, Lane 220, Feng-Tung Rd., Feng-Yuan City, Taichung Hsien (TW)

( * ) Notice: Subject to any disclaimer, the term of this patent is extended or adjusted under 35 U.S.C. 154(b) by 0 days.

(21) Appl. No.: 09/491,656

(22) Filed: Jan. 27, 2000

(51) Int. Cl.[7] .......................... B62K 23/04; B62M 25/04
(52) U.S. Cl. .............................................. 74/502.2; 74/489
(58) Field of Search .................................. 74/502.2, 489, 74/527, 473.13, 473.14, 473.28

(56) References Cited

U.S. PATENT DOCUMENTS 5,802,927 * 9/1998 Yu et al. ............................ 74/502.2
6,021,688 * 2/2000 Chang ................................ 74/502.2
6,067,875 * 5/2000 Ritchey et al. .................... 74/502.2

* cited by examiner

Primary Examiner—Mary Ann Green
(74) Attorney, Agent, or Firm—Alan D. Kamrath; Rider Bennett Egan & Arundel, LLP (57) ABSTRACT

A shifter on a handlebar for operating a derailleur cable of a bicycle derailleur mechanism includes an actuating ring connected to an end of the derailleur cable and received in a frame on the handlebar. A resilient plate extends tangentially from the actuating ring and is engaged with one of dents in the frame. A operation sleeve is mounted to a tube of the frame and connected to the actuating ring so that when rotating the operation sleeve, the actuating ring is rotated and the cable is pulled, while a distal end of the resilient plate is moveably and engaged with one of the dents to provide the rider a clear positioning feature of the gear changing.

15 Claims, 7 Drawing Sheets

SHIFTER FOR OPERATING DERAILLEUR CABLE OF A BICYCLE DERAILLEUR MECHANISM

FIELD OF THE INVENTION

The present invention relates to a shifter on a handlebar for pulling or releasing a derailleur cable of a bicycle derailleur mechanism of bicycle.

BACKGROUND OF THE INVENTION

A conventional gear shifting device known to applicant is disclosed in U.S. Pat. No. 4,900,291 to Sram Corporation. The patent of Sram Corporation involves so many parts and each of which has a complicated shape which results in manufacturing difficulties and high manufacturing cost. Another known bicycle gear shifting device known to applicant is disclosed in U.S. Pat. No. 5,241,877 to Chen. Chen's patent discloses a gear selector that is installed co-axially to the handlebar and the derailleur cable is wrapped around the tubular portion of the selector. However, the way that the derailleur cable is pulled or released by rotating the tubular portion of the selector cannot provide a clear positioning feature for the rider so that the shifting action could be over-operated or less-operated.

The present invention intends to provide a gear shifter on a handlebar to precisely operate the derailleur cable and the shifter provides a clear positioning feature such that the rider clearly feel the positioning feature by engaging a resilient plate engaged with one of the dents defined in an inside of a frame during rotating the shifter.

SUMMARY OF THE INVENTION

In accordance with one aspect of the present invention, there is provided a bicycle derailleur shifter and comprising a frame having a hole so as to be co-axially mount to a bicycle handlebar. An extension portion extends radially from the frame and a tension adjusting member is connected to the extension portion. A tube extends from a first side of the frame and a peripheral skirt extends longitudinally from the first side of the frame. A plurality of dents are defined in an inside of the peripheral skirt. An actuating ring and a disk are respectively mounted to the tube. A first block extends radially outward from the actuating ring and a derailleur cable extends from the first block and through the tension adjusting member. A second block extends from the actuating ring and a resilient plate extends from the second block. A distal end of the resilient plate is engaged with one of the dents in the peripheral skirt. A disk is rotatably mounted to the tube and a torsion spring is connected between the disk and the actuating ring. A push piece extends from a first side of the disk and is located between the first block and the second block.

The object of the present invention is to provide a shifter for changing gears of a bicycle derailleur mechanism and the shifter has a simple structure with clear positioning feature when shifting the derailleur cable.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 2:
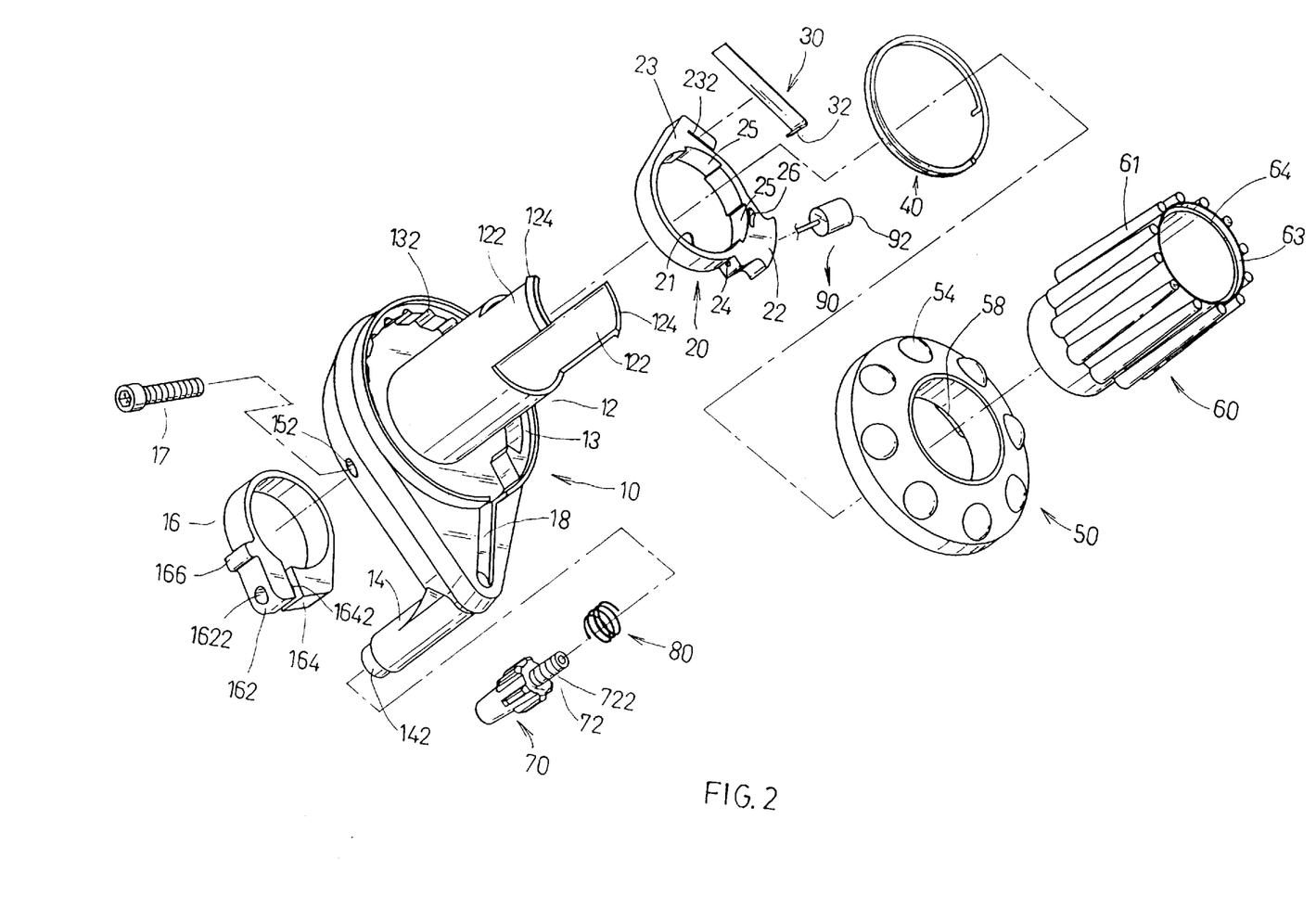
FIG. 2 is an exploded view to show the sifter from seen from the other side of the shifter of the present invention.
Figure 3:
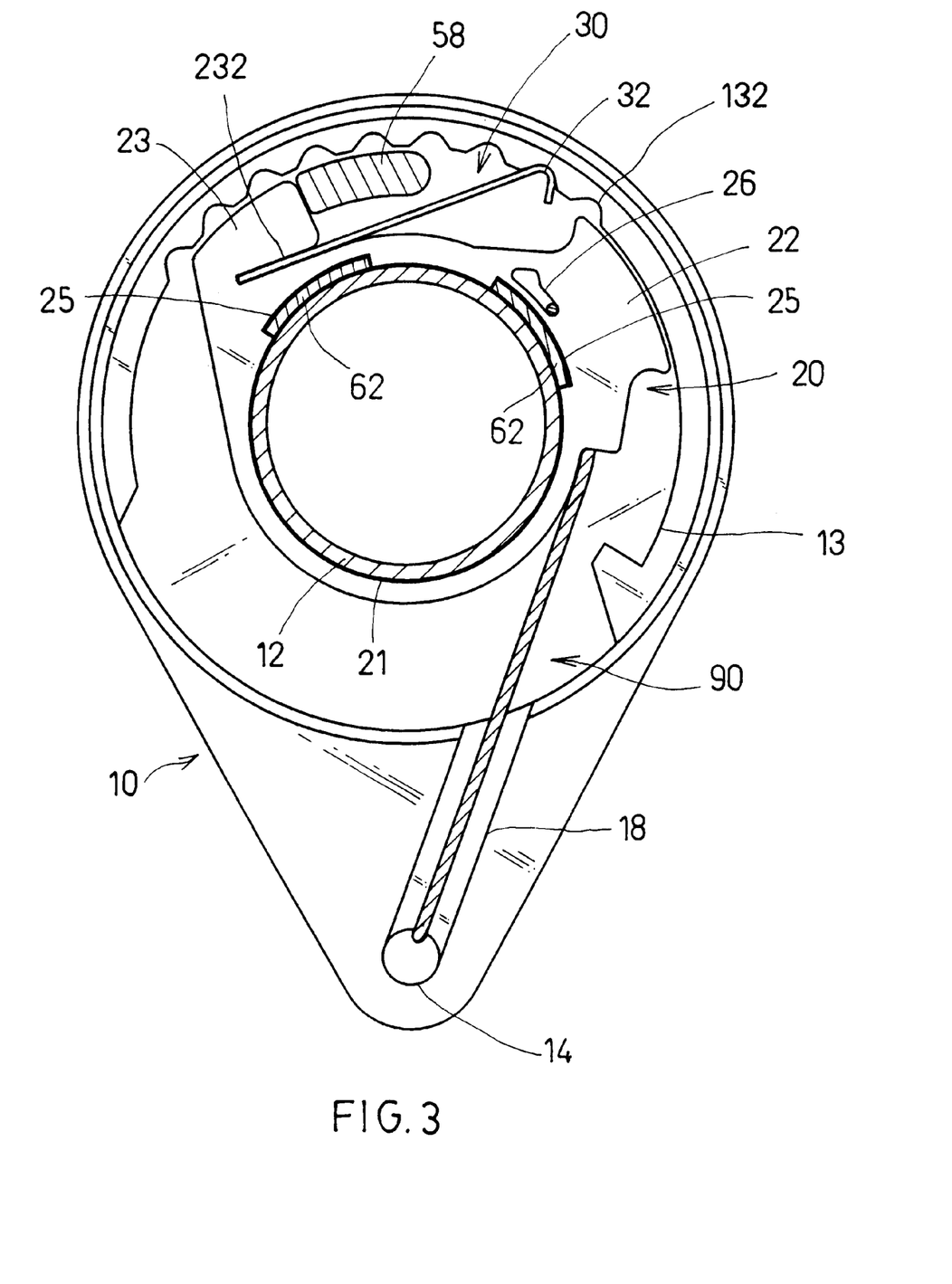
FIG. 3 is an illustrative view to show the cable having one end thereof connected to the actuating ring and the other end of the cable extends through the guide tube on the frame of the shifter.
Figure 4:
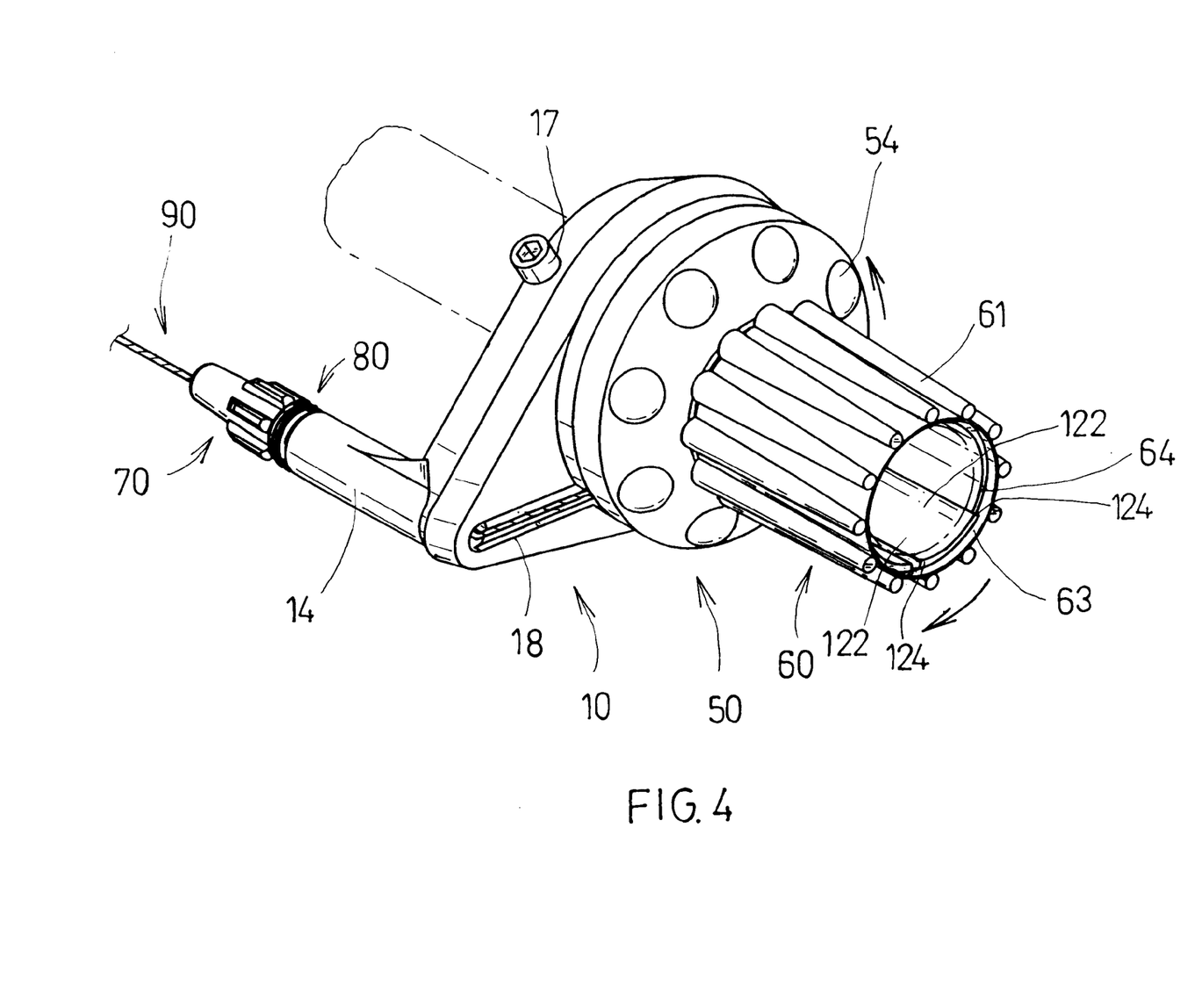
FIG. 4 is a perspective view to show the shifter of the present invention mounted to a handlebar of the bicycle.

Referring to FIGS. 1 to 4, the bicycle derailleur shifter in accordance with the present invention comprises a frame 10 having a hole 11 defined therethrough so as to be co-axially mounted to a bicycle handlebar as shown in FIG. 4. An extension is portion extends radially from the frame 10 and a guide tube 14 extends from the extension portion. A tension adjusting member 70 has an engaging section 72 in which a threaded outer periphery 722 is defined. The engaging section 72 is threadedly received in the guide tube 14. A spring 80 is mounted to a shrink end 142 on the guide tube 14 and biased between the guide tube 14 and ridges extending radially outward from the tension adjusting member 70. A tube 12 extends from a first side of the frame 10 and shares a common axis with the hole 11. Two first lugs 122 extend longitudinally from a distal end of the tube 12 and each first lug 122 has a lip 124 extending radially outward therefrom. A peripheral skirt extends longitudinally from the first side of the frame 10 and a plurality of dents 132 are defined in an inside of the peripheral skirt 13. A passage 18 is defined in the extension portion and located opposite to the guide tube 14. The passage 18 communicates with the guide tube 14 and an area enclosed by the annular skirt 13.

Figure 1:
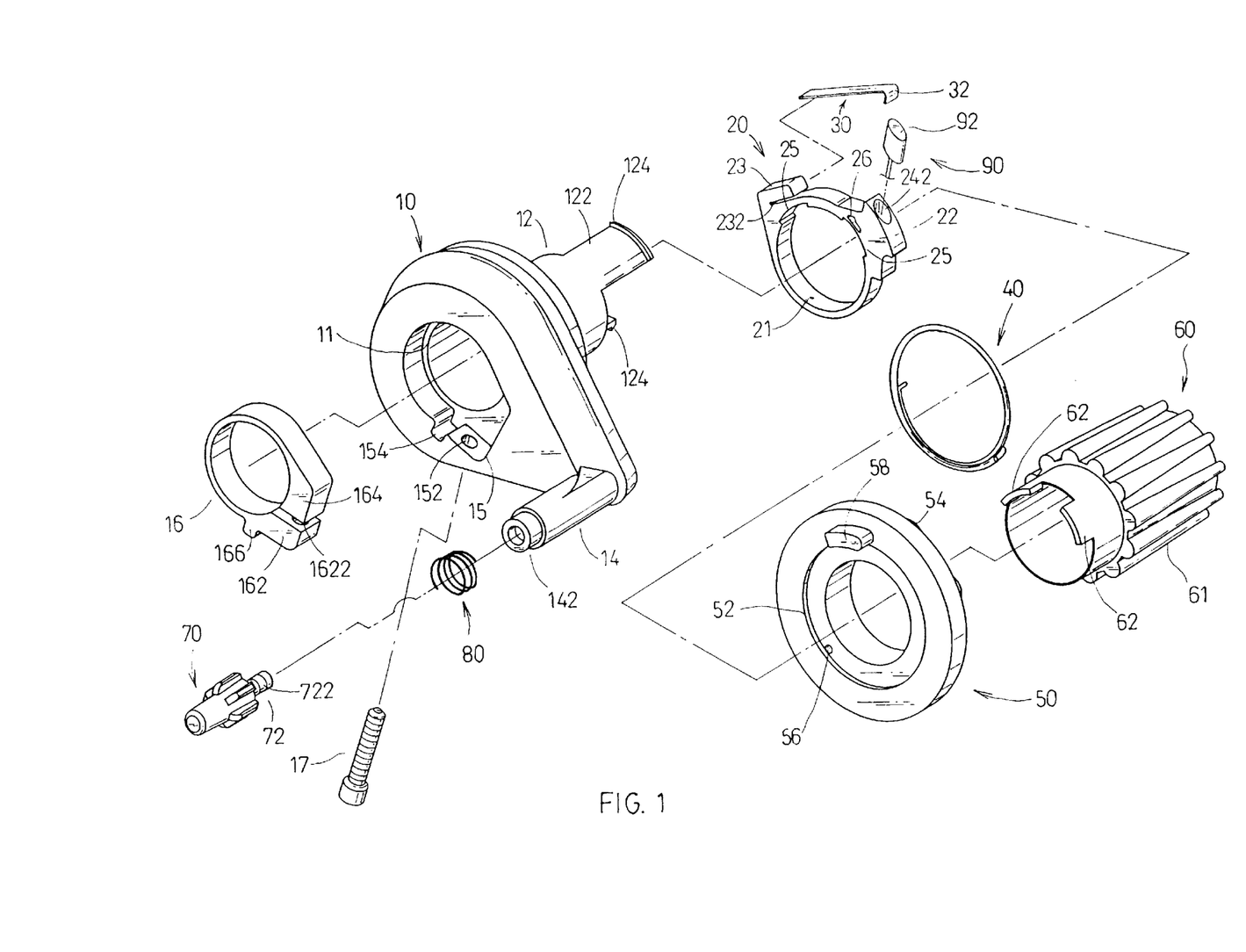
FIG. 1 is an exploded view to show the sifter from seen from one side of the shifter of the present invention.

A recessed area is defined in a first side of the frame 10 and a notch 154 and a positioning recess 15 are respectively defined in an inside of the recessed area. A C-shaped clip member 16 is received in the recessed area and has a protrusion 166 extending radially outward therefrom so that the protrusion 166 is received in the notch 154 and the clip member 16 will not be rotated in the recessed area. The clip member 16 has two ends 162, 164 which are engaged with the positioning recess 15. The end 162 has a through hole 1622 defined therethrough and the other end 164 has a threaded hole 1642 which is in alignment with the through hole 1622. A bolt 17 extends through a hole 152 defined through the frame 10 and the through hole 1622 and engaged with the threaded hole 1642 so that the clip member 16 securely clips the bicycle handlebar.

An actuating ring 20 is mounted to the tube 12 and rotatably engaged with an inside of the peripheral skirt 13. A first block 22 extends radially outward from the actuating ring 20 and a through hole 24 is defined through the first block 22. A sink hole 242 is defined in the first block 22 and communicates with the through hole 24. A first end of a derailleur cable 90 extends through the through hole 24 and a head 92 is connected to the first end of the derailleur cable 90, the head 92 is engaged with the sink hole 242. A second end of the derailleur cable 90 extends through the passage 18 and enters into the tension adjusting member 70 as known manner. A second block 23 extends radially outward form the actuating ring 20 and has a slit 232 defined therein. The resilient plate 30 has one end thereof engaged with the slit 232 and the other end of the resilient plate 30 has a rounded end 32 which is engaged with one of the dents 132 in the peripheral skirt 13. The resilient plate 30 orients tangentially relative to the actuating ring 20.

A disk 50 is rotatably mounted to the tube 12 and a recessed portion 52 is defined in the first side of the disk 50. A concavity 56 is defined in a bottom defining the recessed portion 52 so that a torsion spring 40 is received in the recessed portion 52. An end of the torsion spring 40 is engaged with the concavity 56, the other end of the torsion spring 40 is engaged with another concavity 26 defined in the actuating ring 20 so that the actuating ring 20 returns by the torsion spring 40. A push piece 58 extends from a first side of the disk 50 and is located between the first block 22 and the second block 23. The first block 22 a plurality of bosses 54 extending from a second side of the disk 50 wherein the second side of the disk 50 is a tapered side.

An operation sleeve 60 has an insertion section extending from a first end thereof and the insertion section extends through the disk 50 and the operation sleeve 60 is rotatably mounted to the tube 12 and co-rotatably connected to the actuating ring 20. An annular shoulder 64 extends radially inward from an inside of a second end 63 of the operation sleeve 60 so that the lips 124 of the two first lugs 122 are engaged with the annular shoulder 64. Two second lugs 62 extend longitudinally from the insertion section of the operation sleeve 60 and two connection recesses 25 are defined in an inside 21 of the actuating ring 20 so that the two second lugs 62 are engaged with the two connection recesses 25. A plurality of ribs 61 extend radially longitudinally outward from the operation sleeve 60 so that the rider's hand can securely hold the operation sleeve 60 and rotate the operation sleeve 60.

Figure 5:
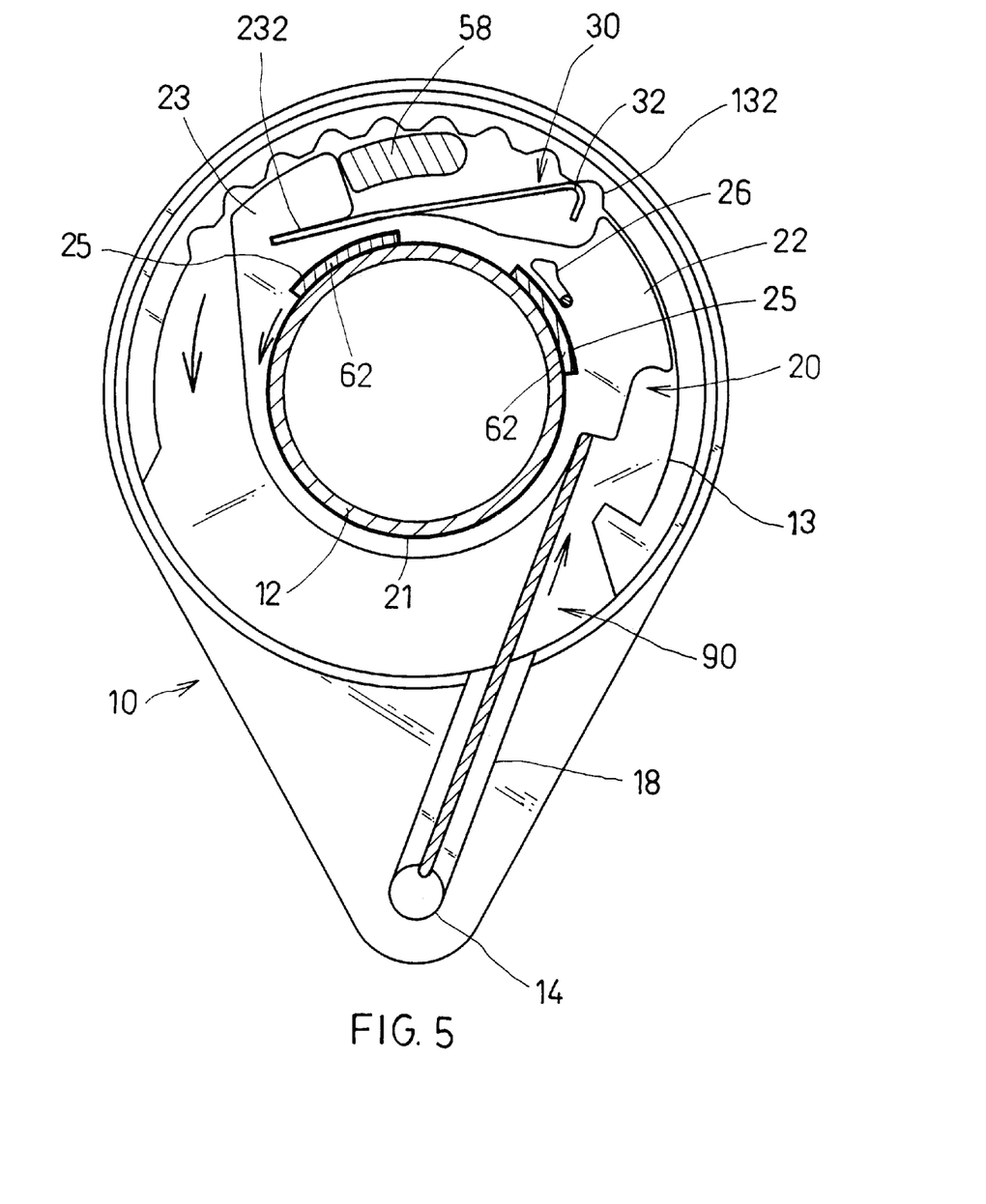
FIG. 5 is an illustrative view to show the cable having one end thereof connected to the actuating ring and the other end of the cable extends through the guide tube on the frame of the shifter, wherein the actuating ring is rotated to pull the derailleur cable.

As shown in FIG. 5, when rotating the operation sleeve 60 to rotate the actuating ring 20 to pull the cable 90, the resilient plate 30 is moved with the actuating ring 20 so that the rounded end 32 of the resilient plate 30 is removed from the dent 132 and moved toward another dent 132. The positioning of the rounded end 32 in the dent 132 provides a so called "indexing feature" for the rider to know which gear is to be operated.

Figure 6:
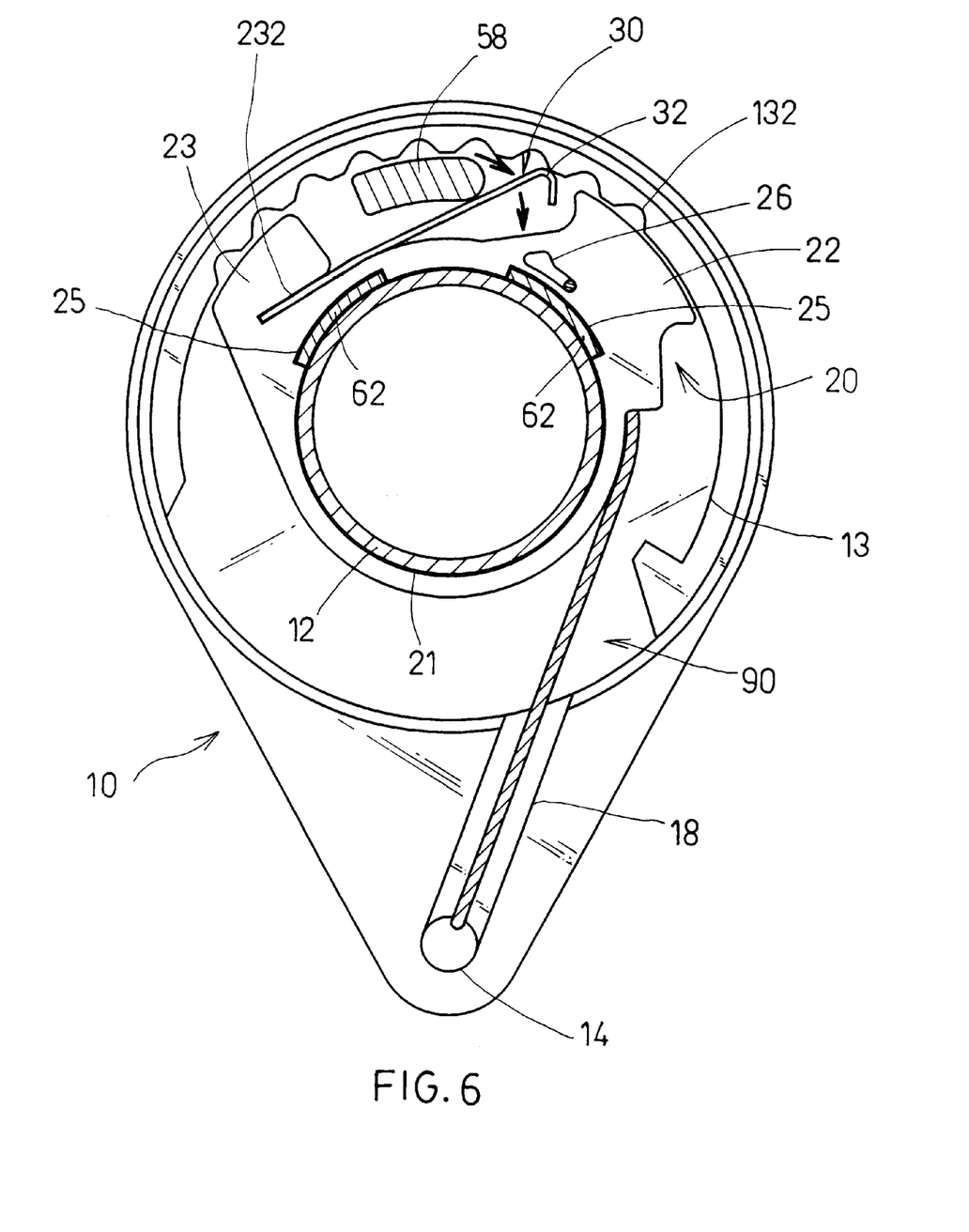
FIG. 6 is an illustrative view to show that the resilient plate is pressed by the push piece on the disk to remove the distal end of the cable from the dent in the frame.
Figure 7:
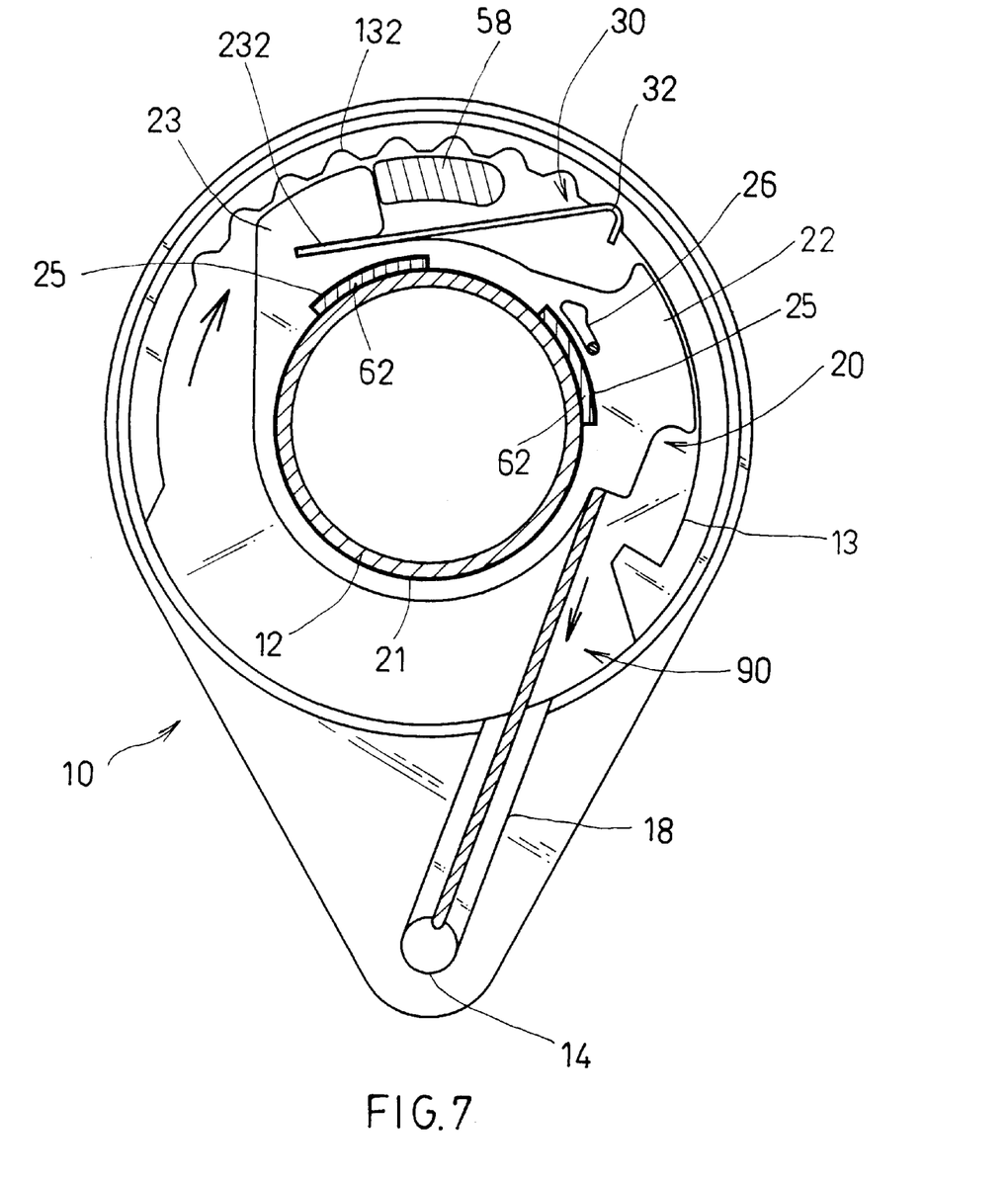
FIG. 7 is an illustrative view to show that when releasing the cable, the distal end of the resilient plate is engaged with another dent and the second block on the actuating ring is stopped by the push piece.

When releasing the cable 90 by rotating the second side of the disk 50, as shown in FIG. 6, the resilient plate 30 is positioned between a dent 132 and the second block 23 so that the actuating ring 20 cannot be rotated. The push piece 58 is moved with the disk 50 to press the resilient plate 30 so that the rounded end 132 can be removed from the dent 132 that the rounded end 132 is engaged and is engaged with another dent 132 as shown in FIG. 7.

The release of the cable 90 can only be achieved by rotating the disk 50 so as to prevent the shifter from unintentionally operated, and the pull of the cable 90 is achieved by rotating the operation sleeve 60.

While we have shown and described various embodiments in accordance with the present invention, it should be clear to those skilled in the art that further embodiments may be made without departing from the scope and spirit of the present invention.

What is claimed is:

1. A bicycle derailleur shifter comprising:
a frame having a hole defined therethrough so as to be adapted to co-axially mount to a bicycle handlebar, an extension portion extending radially from said frame and a tension adjusting member connected to said extension portion, a tube extending from a first side of said frame and sharing a common axis with said hole, a peripheral skirt extending longitudinally from said first side of said frame and a plurality of dents defined in an inside of said peripheral skirt;
an actuating ring mounted to said tube and rotatably engaged with an inside of said peripheral skirt, a first block extending radially outward from said actuating ring and a derailleur cable having a first end thereof connected to said first block and a second end of said derailleur cable extending through said tension adjusting member, a second block extending radially outward form said actuating ring and a resilient plate extending from said second block, said resilient plate having a distal end thereof engaged with one of said dents in said peripheral skirt;
a disk rotatably mounted to said tube and a torsion spring connected between said disk and said actuating ring, a push piece extending from a first side of said disk and located between said second block and said resilient plate, and
an operation sleeve extending through said disk and rotatably mounted to said tube and co-rotatably connected to said actuating ring.

2. The shifter as claimed in claim 1 further comprising a recessed area defined in a first side of said frame and a C-shaped clip member received in said recessed area, a bolt extending through said frame and connected to said clip member so as to be adapted to secure the bicycle handlebar.

3. The shifter as claimed in claim 2 further comprising a notch defined in an inside of said recessed area and said clip having a protrusion extending radially outward therefrom so that said protrusion is received in said notch.

4. The shifter as claimed in claim 2 further comprising a positioning recess defined in an inside of said recessed area and said C-shaped clip member having two ends which are received in said positioning recess.

5. The shifter as claimed in claim 1 further comprising two first lugs extending longitudinally from a distal end of said tube and each first lug having a lip extending radially outward therefrom, an annular shoulder extending radially inward from an inside of a first end of said operation sleeve so that said lips of said two first lugs are engaged with said annular shoulder.

6. The shifter as claimed in claim 1 further comprising two second lugs extending longitudinally from a second end of said operation sleeve and two connection recesses defined in an inside of said actuating ring, said two second lugs engaged with said two connection recesses.

7. The shifter as claimed in claim 1 further comprising a plurality of ribs extending radially longitudinally outward from said operation sleeve.

8. The shifter as claimed in claim 1, wherein said second block has a slit defined therein and said resilient plate has one end thereof engaged with said slit and the other end of said resilient plate has a rounded end.

9. The shifter as claimed in claim 1, wherein said resilient plate orients tangentially relative to said actuating ring.

10. The shifter as claimed in claim 1 further comprising a guide tube extending from said extension portion and said tension adjusting member threadedly received in said guide tube.

11. The shifter as claimed in claim 10 further comprising a passage defined in said extension portion and opposite to said guide tube, said passage communicating with said guide tube and an area enclosed by said annular skirt so that said second end of said derailleur cable extends through said passage and enters said guide tube.

12. The shifter as claimed in claim 1, wherein said first block has a through hole defined therethrough and a sink hole is defined in said first block and communicates with said through hole, a head connected to said first end of said derailleur cable and engaged with said sink hole.

13. The shifter as claimed in claim 1 further comprising a plurality of bosses extending from a second side of said disk.

14. The shifter as claimed in claim 13, wherein said second side of said disk is a tapered side.

15. The shifter as claimed in claim 1 further comprising a recessed portion defined in said first side of said disk and said torsion spring received in said recessed portion.

* * * * *